United States Patent [19]

Verbanac

[11] Patent Number: 4,490,516

[45] Date of Patent: Dec. 25, 1984

[54] CELLULOSIC ORGANIC SOLVENT SOLUBLE PRODUCTS

[75] Inventor: Frank Verbanac, Decatur, Ill.

[73] Assignee: A. E. Staley Manufacturing Company, Decatur, Ill.

[21] Appl. No.: 554,216

[22] Filed: Nov. 22, 1983

[51] Int. Cl.$^3$ .................. C08B 15/06; C08B 15/10
[52] U.S. Cl. .................. 527/312; 525/54.3
[58] Field of Search .................. 536/32, 43, 44; 525/54.3; 527/312

[56] References Cited

U.S. PATENT DOCUMENTS

| | | | |
|---|---|---|---|
| 2,338,681 | 1/1944 | Bock et al. | 536/44 |
| 2,824,779 | 2/1958 | Reeves et al. | 536/44 |
| 3,649,574 | 3/1972 | Cole | 527/312 |
| 4,358,510 | 11/1982 | Ito et al. | 525/54.3 |

FOREIGN PATENT DOCUMENTS

| | | | |
|---|---|---|---|
| 36-24249 | 12/1961 | Japan | 527/312 |
| 45-16474 | 6/1970 | Japan | 525/54.3 |
| 50-48031 | 4/1975 | Japan | 525/54.3 |
| 52-35795 | 9/1977 | Japan | 527/312 |
| 1490128 | 10/1977 | United Kingdom | 527/312 |

*Primary Examiner*—Ronald W. Griffin
*Attorney, Agent, or Firm*—Forrest L. Collins; James B. Guffey

[57] ABSTRACT

The invention provides an improved cellulosic ester or ether product with a degree of substitution of between 2.0 and about 2.9 which is derivatized or further reacted by reaction with an acrylamide reactant to substitute to a D.S. of from about 0.05 to about 0.5 and provide a hydroxyl D.S. of from about 0.05 to about 0.5, and thereby provide a polymerizable organic solvent-soluble product which is insoluble in water and copolymerizable with vinyl monomers. The product is prepared by reacting a cellulose derivative with a catalyst and the acrylamide reactant at a pH of from between about 4.2 and about 4.5. The reaction is carried out at a temperature between 80° C. and 120° C. for from one-half to three hours, while removing the water of reaction.

16 Claims, No Drawings

CELLULOSIC ORGANIC SOLVENT SOLUBLE PRODUCTS

The present invention relates generally to improved cellulosic ester or ether products with a degree of substitution of between 2.0 and about 2.9 and derivatized or further reacted by reaction with an acrylamide reactant to substitute to a D.S. of from about 0.05 to about 0.5 and provide a hydroxyl D.S. of from about 0.05 to about 0.5 and also provide a polymerizable organic solvent-soluble product which is insoluble in water and copolymerizable with monomers.

BACKGROUND OF INVENTION

Cellulosic products are extensively used for a variety of non-food and industrial applications. Products prepared from starch and cellulose have traditionally been used to size or finish textiles and papers; as adhesives in corrugated and laminated paperboards, remoistening gums, and wallpapers; as flocculants; as binders, as for example in foundry core binders; fabric aids; thickeners; and many other applications. Cellulose esters and ethers have been used as plastics for molding, coatings, extrusion and laminates.

Cellulose derivatives have not provided good overall substitutes for synthetic polymeric materials which are primarily produced from petrochemical raw materials. Much effort has been undertaken towards the development of new techniques which would enable the art to use cellulose-based products as a synthetic polymer replacement in applications requiring little or no water-sensitivity. The art has continued to search for effective cellulose-based products for synthetic polymer replacement.

In general, the prior art has provided cellulose acylamides which have water-sensitivity and/or which have not functioned to a high degree as a substitute for synthetic polymeric materials produced from petrochemical raw materials. Indeed, the reaction of cellulose with acrylamides is now well-known and acrylamidomethyl cellulose has been described in the art. Likewise, acryloyl, methacrylyl and crotonic esters of cellulose acetate have been disclosed in the prior art. The reaction of cellulose with N-methylolamides such as methylol ureas, methylol melamines, and methylol cyclic ureas are documented and lead to products which are cross-linked and insoluble. These products have generally found use in the textile industry to provide articles which should retain a permanent shape.

However, the prior art has not found polymerizable organic solvent-soluble cellulose products which are insoluble in water and which are copolymerizable with vinyl monomers, which can be effectively used as coatings, and which can provide more effective substitutes for synthetic polymeric materials primarily produced from petrochemical raw materials. It is recognized as being desirable to have such effective substitutes which can be derived from readily available and replenishable crops each year.

OBJECTS

The principal object of this invention is to provide improved cellulosic products which are polymerizable and organic solvent-soluble.

Another object of the invention is to provide an improved cellulosic ester or ether which can more effectively substitute for synthetic polymeric materials which are produced from petrochemical raw materials.

A still further object of the invention is the provision of a cellulosic derivative which is self-cross-linkable, organic solvent-soluble, and which is copolymerizable with vinyl monomers and which is useful in coatings, adhesives, plastics, and other applications.

Further objects and advantages of this invention will appear from the following disclosure.

DESCRIPTION OF THE INVENTION

The invention is directed to the provision of an improved cellulosic product prepared from a cellulosic derivative which has been derivatized to a degree of substitution (D.S.) of between about 2.0 and about 2.9 by reaction with an acrylamide reactant to substitute the acrylamide in the cellulosic derivative to a degree of substitution (D.S.) of from about 0.05 to about 0.5 and provide a product having a hydroxyl (OH) degree of substitution (D.S.) of from about 0.05 to about 0.5. The improved cellulosic product provides a polymerizable and copolymerizable organic solvent-soluble product which is insoluble in water and which is copolymerizable with many monomers.

The water insoluble cellulose is characterized by having the hydroxyl groups substituted to a degree of substitution of more than about 2.0 and less than 3.0. The cellulose useful in this invention has been reacted to provide an ester or ether with a hydrophobic substituent which is substituted in the cellulose to a D.S. of between about 2.0 and about 2.9 thereby leaving hydroxyl at a D.S. of 0.1 to 1.0. The hydrophobic substituent preferably has a carbon chain length of from $C_2$ to $C_7$ and may be aliphatic or aromatic. The resulting ester or ether is reacted with an acrylamide to substitute it to a D.S. of between about 0.05 to about 0.5 leaving the hydroxyl at a D.S. of between about 0.05 and about 0.5 in the product of the invention.

The acrylamide reactants include N-methylol and N-methylthio acrylamides such as N-(hydroxymethyl)acrylamide; N-(hydroxymethyl)-N-[(1-hydroxymethyl)propyl]acrylamide; N-(hydroxymethyl-2-alkyl acrylamides, (e.g. N-(hydroxymethyl)-2-(methyl-heptyl)acrylamide; N-[(hydroxymethyl)-1-nonyl]-2-methyl acrylamide; N-(1-hydroxymethyl)-2-methyl acrylamide; N-(hydroxymethyl)-2-propyl acrylamide; etc.) N-(mercaptomethyl)acrylamide; N-methylol-N-isopropyl acrylamide; 3-(N-methylol acrylamido)-3-methyl butyl trimethyl ammonium chloride (cationic); sodium-2-N-methylol acrylamido-2-methyl propane sulfonate (anionic-$CH_2$:$C(H)C(:O)N(CH_2OH)C(CH_3)_2CH_2SO_3$-NA+), combinations thereof and the like.

In the method of the invention, the water-insoluble cellulosic derivative is first prepared, but it may be purchased in the marketplace. The derivative will have a D.S. of between 2.0 and about 2.9, and preferably between 2.4 and 2.8. The cellulosic derivative is mixed with a catalyst, such as ammonium chloride, and an acrylamide reactant. The pH should be in the range of between about 4.2 and about 4.5. The acrylamide reactant may be in a dry form or may be in a solution of water or suitable solvent.

A polymerization inhibitor such as methyl hydroquinone is optionally included in the reaction, as well as a swelling agent, such as ethylene glycol, propylene glycol, or N-methyl pyrrolidone.

Water or solvent may then be removed from the mixture under conditions which will not cause the acrylamide reactant to polymerize or react. Temperatures below 80° C. are preferred and vacuum-drying, oven-drying or similar conditions may be employed. It will be understood, however, that moisture or solvent may be present during reaction. The mixture may be spread in a thin layer for drying to a free-flowing powder. The dried mixture is then milled if necessary and reacted in the temperature range of 80° C. to 120° C. for from about one-half to about three hours. It is important to effect removal of water formed during reaction. The reacted product may be washed by suspending in water, and neutralized to pH 5–6. The reacted product is filtered and washed until free of catalyst. The recovered product is dried and should have a nitrogen content equivalent to the acrylamide reactant used at the desired degree of substitution. The measurement of the nitrogen content can be used to determine that the desired degree of reaction has occurred. When using N-methylolacrylamide, the nitrogen content of the recovered product will be between about 0.2 and about 2%. The end product is soluble in organic solvents and vinyl monomers, and well-adapted to self-polymerization and copolymerization reactions.

The products of the invention may be utilized by homopolymerization or copolymerization to prepare solvent-insoluble internally plasticized, controlled swelling, modified films, coatings, inks, castings, adhesives, membranes and compositions. Polymerization may be effected by radiation as with ultraviolet light, white light, or electron beam, and thermal-curing techniques. Generally, the products can be demonstrated to be compatible with petrochemical-based monomers, oligomers and resins in curable films, coatings, inks, castings, adhesives, membranes and composites. The coatings are effective on wood, paper, metal and plastics so that they are utilizable on containers, furniture, floors, equipment and machinery, appliances, automobiles, trucks, pipe, boats, paper products, and wire as insulation.

ABS, acrylic, polyacrylonitrile, alkyds, diallylphthalate, phenolic, polyester, polystyrene, PVC resins can be modified by copolymerization or compounding with the products of the invention. The compatibility of the products of the invention with many monomers readily leads to the formation of a large number of polymers.

A film can be prepared by mixing an acrylamidomethyl cellulose acetate butyrate with ethylacrylate at various levels and a photo-initiator, and spreading the mixture on a treated metal base such as sheets sold under the trademark, Bonderite 37. Curing can be effected by ultraviolet light in a short time to provide various desirable physical properties including elongation, reverse impact, tensile strength, and elastic modulus.

Castings of copolymers of the products of the invention with ethyl acrylate, butyl acrylate, methyl methacrylate and styrene show low-water absorbence.

Homopolymerization can be effected by solubilizing the products of the invention in a low-boiling organic solvent, such as acetone, in the presence of an initiator, such as benzoyl peroxide, with thermal cure.

Various adhesive formulations may be prepared with the products of the invention. For example, a product may be mixed with 2-hydroxyethyl acrylate and acetone along with benzoyl peroxide and dimethyl aniline to provide an adhesive which strongly bonds to birchwood, glass and aluminum.

EXAMPLE 1

First, 2,070 gm of deionized water were placed in a 19-liter battery jar, and 138 gm of ammonium chloride and 19.9 gm of p-methoxyphenol were added. The ingredients were stirred vigorously with stainless steel stirrers and impellers until the ammonium chloride and p-methoxyphenol became dissolved. Next, 1,857 gm of N-methylolacrylamide, as a 48-weight percent aqueous solution, was added with continued stirring. Then 3,000 gm, on a dry solids basis (dsb), of cellulose acetate butyrate, sold by Eastman Chemicals under the designation, CAB 551-0.01, was slowly added and mixed in. The cellulose acetate butyrate had a viscosity of 0.1 seconds; an acyl content of 2.0% acetyl and 53% butyryl; and a hydroxyl content of 1.5%. The D.S. was 2.76. The pH was determined and adjusted to the range of between 4.2 and 4.5. Stirring was continued for one and a half hours and the slurry then filtered. The resulting filter cake was washed with a portion of the filtrate and the "wet cake" was transferred to steel trays. The product was air-dried in a well-ventilated hood for about two days to a moisture content to about 4% to form a reactive premix.

After air-drying, the premix was placed on stainless steel trays and reacted for one hour at 100° C. in an oven. The reacted product was then cooled to room temperature in a well-ventilated hood.

The reacted product was then slurried in deionized water and the pH determined to be 3.5. This pH was adjusted to 5.5 with dilute sodium hydroxide. The slurry was stirred for about eight hours and then filtered. Washing was continued until the filtrate was free of chloride ion. The product was then washed with fifty w/w percent aqueous ethanol (3A) and was suspended overnight in the aqueous ethanol. The reacted product was again filtered and washed with deionized water to remove residual alcohol. The product was again transferred to a tray and dried at about 55° C. until a moisture level of about 2% was reached. The product had 0.4% nitrogen. The D.S. of the acrylamide was 0.11 and the hydroxyl was 0.13.

The product is a dry, free-flowing, white to off-white powder, which is useful in producing tough, hard, high-gloss, durable copolymerizates.

The product is useful for reactive coatings and inks copolymerized with monomers, drying oils, unsaturated polyesters, and/or alkyd resins to produce high molecular weight useful films. The product had a melting point of 110° C. to 125° C., provided rheological control to minimize running and sagging, improved inter-coat adhesion, eliminated cratering, and reduced dry-to-touch time. The product copolymerizes vinyl monomer vehicles both thermally and photochemically, and does not homopolymerize during storage.

The product had a Brookfield viscosity of 220 cps at 40 weight percent in methyl ethyl ketone at 25° C.

The product is soluble at 40 weight percent in the following:

| | |
|---|---|
| Methyl acrylate | |
| Ethyl acrylate | |
| Butyl acrylate | |
| Methyl methacrylate | |
| Vinyl acetate | |
| Vinylidene chloride | |
| Styrene | |
| Styrene:methyl methacrylate | 80:20 |

| -continued | |
|---|---|
| 2-Hydroxyethyl acrylate | |
| N—vinyl pyrrolidone | |
| Styrene:methanol | 80:20 |

The hydroxyl content, calculated as weight percent, was 1.1% OH. The acid value was zero, and the D.S. of the vinyl group was 0.11.

EXAMPLE 2

A portion of the "wet cake" from Example 1 was dried in a 60° C. oven for about five hours to a moisture of about 4%. The oven-dried reaction mixture was then placed on a stainless steel tray and reacted for seventy-five minutes in an oven at 100° C. The reacted product was slurried in deionized water and the pH was adjusted to 5.5 with dilute sodium hydroxide. The slurry was stirred for an hour, filtered and washed free of the catalyst. The product was then washed with fifty w/w percent aqueous ethanol (3A) and was suspended overnight in the aqueous ethanol. The product was filtered, washed with deionized water to remove the alcohol and dried at 55° C. until a moisture of less than 2% was reached. The product contained 0.43% nitrogen. The acrylamide D.S. was 0.11 and the hydroxyl 0.14.

EXAMPLE 3

Cellulose acetate D.S. 2.76 (100.5 gm; formula weight 265.6); 43 gm 48% (w/w/) of N-methylolacrylamide; 3.43 gm of ammonium chloride, and 0.33 gm of p-methyl hydroquinone were mixed in 284 gm of water. The mixture was stirred for 1.5 hours, filtered and 222 gm of filtrate was collected for a retention of 33% of the aqueous phase in the cellulose acetate "wet" reaction premix. The "wet" premix (76.6 gm; 50% moisture) was placed on a stainless steel tray and reacted in a 110° C. oven for two hours and thirty-five minutes. The crude product was suspended in 100 ml. of water with stirring. The pH was adjusted from 3.65 to 6.0 with 0.5N aqueous sodium hydroxide. After filtering, washing free of catalyst and drying at 55° C. the product had a nitrogen content of 0.54% (0.11 D.S.).

The corresponding reaction premix was air-dried to 12% moisture. It was reacted 1.5 hours at 110° C. and yielded a product which contained 0.54% nitrogen (0.11 D.S.).

EXAMPLE 4

Two hundred gm of cellulose acetate (formula weight 265.6) was placed in a 2-liter single-neck distilling flask. The flask was attached to a Buchi Rotavapor unit and rotated. The pressure was reduced to 5 inches of vacuum and 24.7 gm of a water solution of 10.8 gm of N-methylolacrylamide, 2 gm of ammonium chloride and 0.2 gm of methy hydroquinone was added through an inner Teflon delivery tube of the Rotavapor. The reactant mixture was followed by 8.5 gm of water as a wash for the delivery tube. The vacuum was released and the mixture in the rotating flask was tumbled for one hour. Small "wet" layers on the sides of the flask next to the neck and the bottom were scraped off. Some glass beads and pieces of glass tubing (5 mm long and 5 mm diameter) were added to the blend to break soft aggregates. The blending was continued for two hours. The glass beads and tubing were removed by passing the solid through a 20-mesh screen (with no shaking).

The wet reaction mix (103.5 gm) was placed in a one-liter single-neck flask and the flask was attached to the Buchi Rotavapor. The flask was evacuated to 28 inches vacuum and, while rotating, was immersed in a 110° C. oil bath for two hours. The water was collected in dry ice traps. The product tumbled freely during the reaction. The reaction mixture was suspended in 280 ml. of water and the pH was adjusted from 3.5 to 6.0 with 0.5N sodium hydroxide solution. The product was filtered, washed free of catalyst and other by-products and dried at 50° C. The nitrogen content was 0.51% (0.10 D.S.). A portion of the above premix was reacted in a 110° C. forced-air oven for 1.5 hours. The nitrogen content of the product was 0.54% (0.106 D.S.).

EXAMPLE 5

An acrylamidomethyl cellulose acetate was prepared at a 0.5% nitrogen level by the method of Example 1 except that the ingredients comprise:

| Cellulose acetate, | 2,500 gm (dsb) |
|---|---|
| N—methylolacrylamide, 48% | 1,067 gm |
| Ammonium chloride | 81.8 gm |
| Methoxyphenol | 8.3 gm |
| Water, deionized | 7,083 gm |

The cellulose acetate was obtained from Eastman Chemicals and identified as CA-398-3. The viscosity measured 11.4 poises. The acetyl content was 39.8% and the combined acetic acid analyzed 55.5%. The hydroxyl content measured 3.5%. The cellulose acetate had a D.S. of 2.46.

The product was a dry, free-flowing, white to off-white powder producing tough, hard, high-gloss durable copolymerizates.

The powder had a Brookfield viscosity at 30 weight percent level in methyl ethyl ketone at 25° C. of 13,000 cps.

The product was soluble at 20 weight percent in:

| N—Vinyl pyrrolidone | |
|---|---|
| 2-Hydroxyethyl acrylate | |
| Acrylic acid | |
| Ethyl acrylate:N—vinyl pyrrolidone | 80:20 |
| Methyl methacrylate:N—vinyl pyrrolidone | 80:20 |
| Styrene:N—vinyl pyrrolidone | 50:50 |
| Ethyl acrylate:2-Hydroxyethyl acrylate | 80:20 |
| Methyl methacrylate:2-Hydroxyethyl acrylate | 80:20 |
| Styrene:2-Hydroxyethyl acrylate | 50:50 |

Hydroxyl content, calculated as weight percent, was 3.2%; the acid value was zero and the D.S. of the vinyl group was 0.11. The nitrogen content was 0.5%. The product is useful in making a thermal-cured film and in adhesive formulations. It also exhibited monomer solubility.

EXAMPLE 6

Acrylamidomethyl cellulose acetate butyrate was made at a 0.4% nitrogen level in accordance with Example 1, except that the ingredients included:

| Cellulose acetate butyrate | 3,000 gm |
|---|---|
| N—methylolacrylamide, 48% | 1,521 gm |
| Ammonium chloride | 55 gm |
| p-methoxyphenol | 5.5 gm |
| Water | 791 gm |

The cellulose acetate butyrate was obtained from Eastman Chemicals and identified as CAB 381-1. It had a viscosity of 0.38 poises. The acetyl content was 13.0% and the butyryl content was 37%. The hydroxyl content was 1.0%. The total D.S. was 2.73 of substitution.

The product had compatibility with the following monomers at 40 weight percent with the indicated clarity as follows:

| | |
|---|---|
| Methyl acrylate | clear |
| Ethyl acrylate | slight haze |
| Butyl acrylate | clear |
| Methyl methacrylate | clear |
| Vinyl acetate | slight haze |
| Vinylidene chloride | clear viscous fluid |
| Styrene | |
| Styrene/methyl methacrylate (80/20) | clear |
| Styrene/methanol (80/20) | clear |

EXAMPLE 7

An acrylamidomethyl ethyl cellulose was prepared from three grades of ethyl cellulose identified as N-4; N-7; and K-14 obtained from Hercules, Inc. The characteristics of the product were as follows:

| | N-4 | N-7 | K-14 |
|---|---|---|---|
| Viscosity, cps (5% wt. soln. in 80/20 (wt) toluene/ethanol | 5 | 6.8 | 14 |
| Ethoxyl | 48.4 | 48.9 | 46.4 |
| Estimated Formula weight | 231.7 | 232.8 | 227.8 |

The D.S. of the products were 2.49, 2.53, and 2.35 respectively.

Premixes of the following ingredients were prepared as follows:

| | | | |
|---|---|---|---|
| Ethyl cellulose, as is, (dry), gm | 58.8(58) | 58.9(58) | 58.2(58) |
| N—methylolacrylamide, 48% in water, (dry), gm | 26.9(12.9) | 24.8(11.9) | 34.2(16.4) |
| NH$_4$Cl (0.1 g/ml H$_2$O), ml | 12 | 12 | 12 |
| N—methylpyrrolidone, ml | 10 | 10 | 10 |
| Methyl hydroquinone, gm | 0.01 | 0.01 | 0.01 |
| Water, gm | 25 | 20 | 25 |

The premixes were mixed and the resulting semi-fluid mass was layered onto a flat tray and air-dried as a relatively thin layer until the moisture level was about 10%. The dried product was powdered and blended.

Each of the formulations was reacted at one and two hours at 93° C. and 103° C., whereupon they were suspended in water and the pH adjusted to 5.5. The filter cake was washed with water until free of chloride ion and the product then dried.

One gram each of the dry products was dissolved in 5 ml of toluene. Polymerizations were carried out at 70° C. for 16 hours with 25 mg azobis (isobutyronitrile) initiator. The gels were extracted repeatedly with toluene and the solubles in the combined washes determined.

| Reaction Temp. °C. | N-4 | | N-7 | | K-14 | |
|---|---|---|---|---|---|---|
| | 93 | 103 | 93 | 103 | 93 | 103 |
| | % Nitrogen (N) | | | | | |
| | % Solids (S) | | | | | |
| Reaction Time, Hr. | N S | N S | N S | N S | N S | N S |
| 1 | 0.51 46 | 0.50 32 | 0.59 20 | 0.46 14 | 0.94 9 | 0.73 8 |
| 2 | 0.58 33 | 0.55 34 | 0.59 17 | 0.43 16 | 1.0 13 | 0.75 9 |

The products are soluble in acetone, toluene, N-methylpyrrolidone, ethyl acetate, tetrahydrofuran, chloroform. It is soluble in various monomers.

The various features of the invention which are believed to be new are set forth in the following claims.

What is claimed is:

1. A polymerizable cellulosic ester or ether product capable of homopolymerization having a degree of substitution of between 2.0 and about 2.9 reacted with an acrylamide reactant containing a methylol group to substitute to a degree of substitution of from about 0.05 to about 0.5 and provide a hydroxyl degree of substitution of from about 0.05 to about 0.5.

2. A cellulosic product in accordance with claim 1 which is organic solvent-soluble and copolymerizable with vinyl monomers.

3. A cellulosic product in accordance with claim 1 having a degree of substitution of between 2.4 and 2.8.

4. A cellulosic product in accordance with claim 1 in which the acrylamide reactant containing a methylol group is selected from the group consisting of N-methylol and N-methylthio acrylamides such as N-(hydroxymethyl)acrylamide; N-(hydroxymethyl)-N-[(1-hydroxymethyl)propyl]acrylamide; N-(hydroxymethyl)-2-alkyl acrylamides, (e.g., N-(hydroxymethyl)-2-(methylheptyl)acrylamide; N-[(hydroxymethyl)-1-nonyl]-2-methyl acrylamide; N-(1-hydroxymethyl)-2-methyl acrylamide; N-(hydroxymethyl)-2-propyl acrylamide; N-(mercaptomethyl)acrylamide; N-methylol-N-isopropyl acrylamide; 3-(N-methylol acrylamido)-3-methyl butyl trimethyl ammonium chloride (cationic); sodium-2-N-methylol acrylamido-2-methyl propane sulfonate (anionic-CH$_2$:C(H)C(:O)N(CH$_2$OH)C(CH$_3$)$_2$CH$_2$SO$_3$Na combinations thereof.

5. A product in accordance with claim 1 in which the cellulosic product is derived from cellulose acetate.

6. A product in accordance with claim 1 in which the cellulosic product is derived from cellulose acetate butyrate.

7. A product in accordance with claim 1 in which the cellulosic product is derived from ethyl cellulose.

8. A product in accordance with claim 1 in which the cellulosic product is derived from cellulose acetate proprionate.

9. A product in accordance with claim 1 in which the cellulosic product is derived from cellulose 2-cyanoethyl ether.

10. A product in accordance with claim 1 in which the acrylamide reactant is N-methylolacrylamide.

11. A product in accordance with claim 1 in which the acrylamide reactant is N-methylolmethacrylamide.

12. A method for preparing a polymerizable cellulosic ester or ether product capable of homopolymerization comprising the steps of providing a cellulosic derivative having a degree of substitution of between 2.0 and about 2.9, mixing said derivative with a catalyst and an acrylamide reactant containing a methylol group, adjusting the pH to between about 4.2 and about 4.5, and then heating the mixture to a temperature of between 80° C. and 120° C. for from one-half to three hours while removing water of reaction from the mixture.

13. A method in accordance with claim 12, wherein the water of reaction is removed as it is formed.

14. A method in accordance with claim 12 wherein the product is washed after reaction.

15. A method in accordance with claim 12 wherein the mixture is dried under vacuum prior to reaction.

16. A method in accordance with claim 15 wherein the drying is carried out at temperatures below reaction temperatures.

* * * * *